United States Patent [19]

Fielding

[11] Patent Number: 4,538,792
[45] Date of Patent: Sep. 3, 1985

[54] LOADING DOLLY

[75] Inventor: Lawrence E. Fielding, Enon, Ohio

[73] Assignee: The United States of America as represented by the Secretary of the Air Force, Washington, D.C.

[21] Appl. No.: 512,062

[22] Filed: Jul. 8, 1983

[51] Int. Cl.$^3$ .............................................. B60P 1/48
[52] U.S. Cl. .................................................. 259/8 R
[58] Field of Search .............. 254/8 R, 8 C, 9 R, 9 C, 254/10 R, 10 C, 133, 134; 280/43.17, 43.24; 414/495, 589, 590

[56] References Cited

U.S. PATENT DOCUMENTS

| | | | |
|---|---|---|---|
| 2,712,869 | 7/1955 | Belt . | |
| 2,748,459 | 6/1956 | Orr | 254/134 |
| 2,907,575 | 10/1959 | Locker . | |
| 2,922,534 | 1/1960 | Voraska et al. | 414/495 |
| 2,974,972 | 3/1961 | Hassell | 414/495 |
| 3,633,776 | 1/1972 | Moore | 414/495 |
| 3,880,310 | 4/1975 | Hunziker | 414/495 |

OTHER PUBLICATIONS

Detail Specifications & Dimensional Layout of MHU-83 A/E Munitions Handling/Loading Unit, Part No. 69J4983-3, pp. A-31A & B.

Primary Examiner—Robert C. Watson
Attorney, Agent, or Firm—Donald J. Singer; John R. Flanagan

[57] ABSTRACT

A loading dolly has a loading frame adapted to be raised or lowered through horizontal movement of screw jacks which pivot mobile carriages, articulately coupled to the jacks and frame, in a generally vertical direction about the loading frame.

4 Claims, 4 Drawing Figures

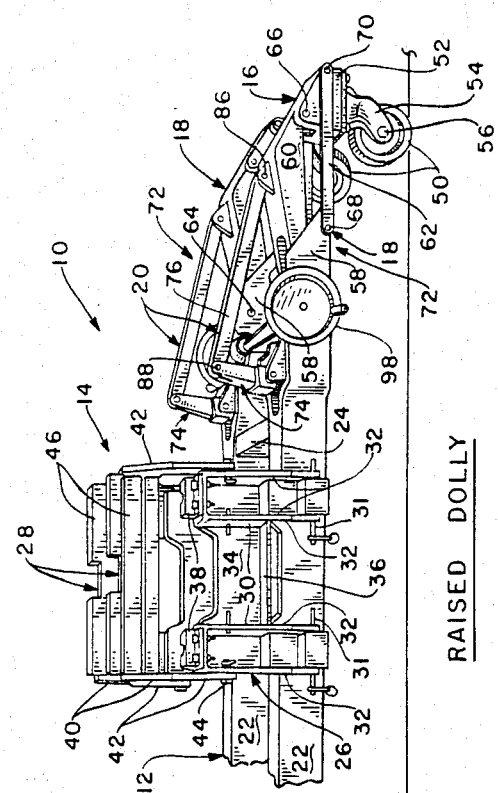
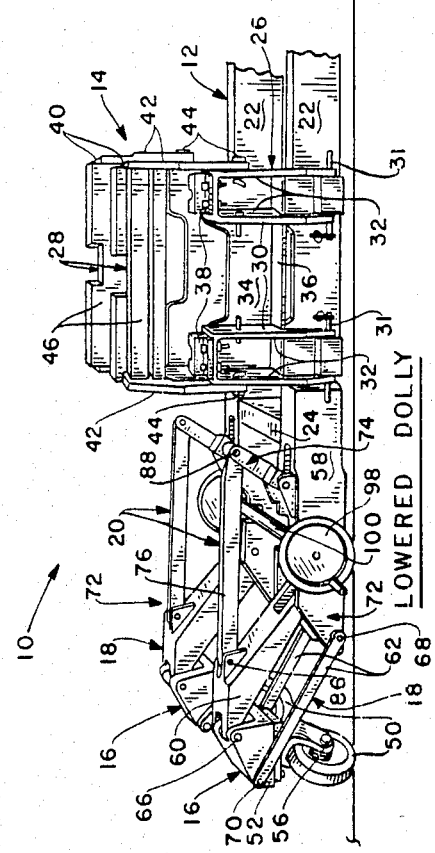

LOADING DOLLY

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to loading apparatus and, more particularly, is concerned with a dolly having a loading frame configured to be raised or lowered through horizontal movement of screw jacks which pivot mobile carriages, articulately coupled to the jacks and frame, in a generally vertical direction about the loading frame.

2. Description of the Prior Art

Placement and up/down loading and removal of large Electronic Countermeasure (ECM) pods must be carried out at the centerline external store position on the F-16 aircraft. Certain deficiencies presently exist in equipment needed to accomplish centerline up/down loading of ECM pods within the time constraints for aircraft configuration changes.

Currently, an ECM pod is positioned beneath the aircraft by a MHU-83 munitions loading vehicle. The limited hydro-mechanical movements of this complex machine coupled with minimal clearances between the pod and aircraft yields a time consuming and tedious operation. Other external stores (fuel tanks, racks, etc.) loaded on the adjacent wing station must be removed before attempting an up or down loading of the ECM pod. An average time for this operation is 45 to 60 minutes. Accomplishing this operation within the confines of a shelter or revetment where side accessibility to the aircraft is limited and where other servicing equipment is present accentuates the problem.

Consequently, there exists a need for pod loading equipment having greater maneuverability and which minimizes the amount of space required to accomplish the loading function.

SUMMARY OF THE INVENTION

The present invention provides a loading dolly designed to satisfy the aforementioned needs. The dolly is compact and light-weight compared to the equipment used heretofore. It employs commercially proven screw jacks which are more reliable than the hydraulic actuating systems utilized heretofore. Use of the dolly has demonstrated drastic decreases in loading time. For instance, initial loading using inexperienced ground crews were under 15 minutes. Further, removal of other externally hung stores is not required. Due to the configuration and enhanced maneuverability of the dolly, accessibility to the aircraft centerline is not restricted. It can be accomplished either from the front or aft. Pod removal can also be obtained from either the front or back thereby virtually eliminating any interference or inconvenience imposed by other servicing equipment. Additionally, the pod supports on the dolly are convertible to accommodate different pod configurations.

Accordingly, the present invention is directed to a loading dolly, such as one for loading an electronic countermeasure pod on an aircraft. The dolly basically includes: (a) an elongated frame having opposite ends; (b) means mounted on the frame for supporting a component, such as an ECM pod, loaded thereon; (c) a plurality of mobile carriages disposed and spaced apart from one another at each of the opposite ends of the frame; (d) a plurality of linkage sets, each set articulately interconnecting one of the mobile carriages with its respective end of the frame for allowing generally rectilinear vertical movement of the frame relative to the carriage; and (e) a plurality of lift mechanisms, each mechanism coupled between one of the linkage sets and its corresponding end of the frame and being operable for raising and lowering the frame end relative to the one carriage which is connected to the one linkage set. The dolly frame is generally rectangular in shape, having a pair of elongated side members and a pair of end members interconnecting the side members. Each linkage set and mobile carriage form a four-bar linkage which aligns the carriage with one side member of the frame and which, upon movement between extended and retracted positions causes the generally rectilinear movement of the frame between the raised and lowered positions relative to the one carriage. Each lift mechanism includes a screw jack having a screw shaft operable for extension and retraction in a generally horizontal direction for causing generally pivotal movement of its associated four-bar linkage relative to the dolly frame in a generally vertical direction between the extended and retracted positions of the linkage. Thus, horizontal (expansion or retractive) movement of each screw jack is transitioned into vertical lifting (raising or lowering) movement of the dolly frame. This transition or translation of motion is accomplished through a series of geometrical relationships which are optimized to yield maximum movement with minimal force exerted by each of the handcrank drive wheels associated with the screw jacks.

BRIEF DESCRIPTION OF THE DRAWINGS

FIG. 2 is a fragmentary side perspective view of the loading dolly of FIG. 1, illustrating it in a lowered position.

FIG. 3 is a fragmentary side perspective view of the loading dolly of FIG. 1, illustrating it in a raised position.

DETAILED DESCRIPTION OF THE INVENTION

Figure 1:
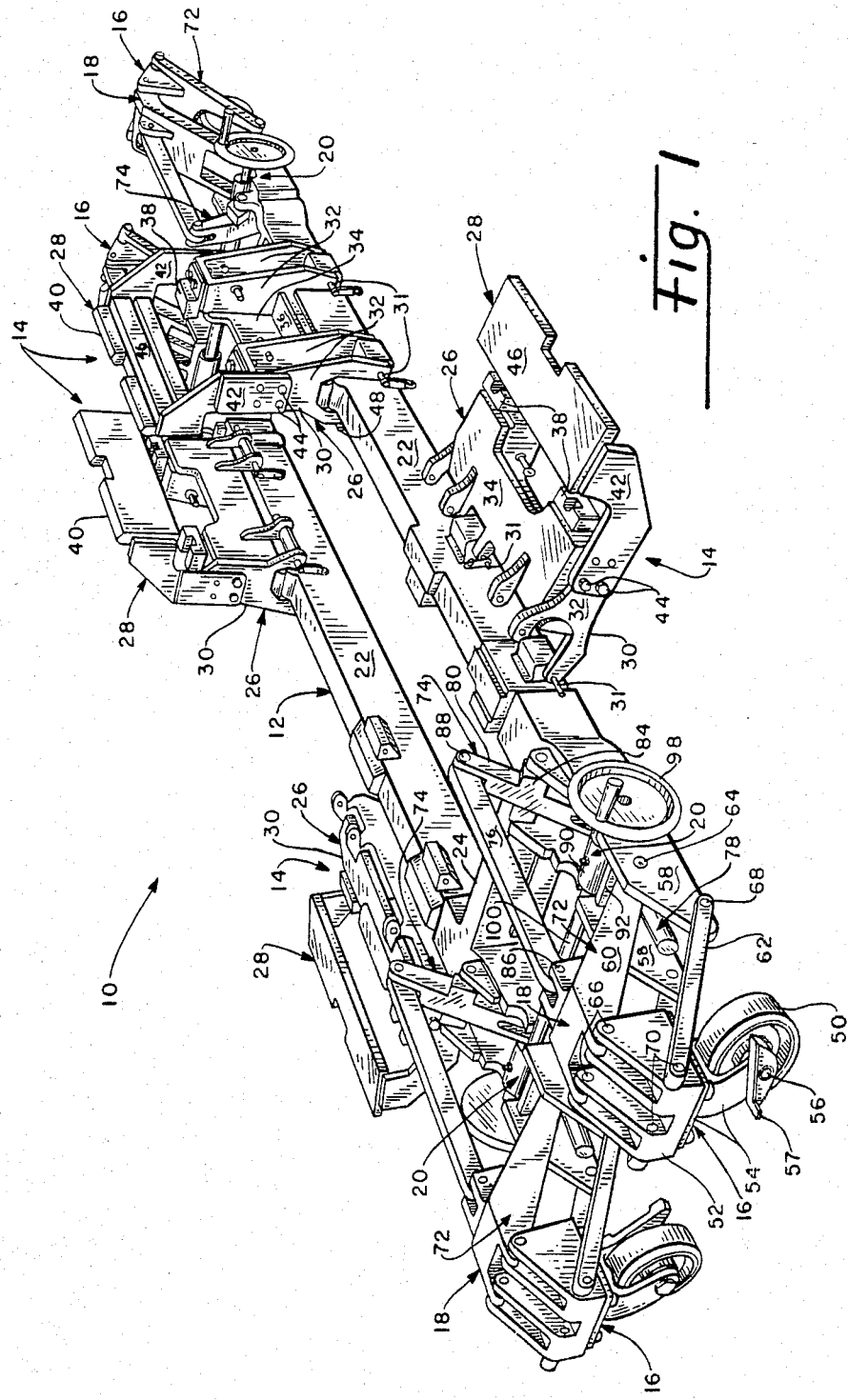
FIG. 1 is a perspective view of the loading dolly embodying the principles of the present invention.

Referring now to the drawings, and more particularly to FIG. 1, there is shown the preferred embodiment of the loading dolly of the present invention, being generally designated 10. The loading dolly 10 includes a generally rectangular frame 12, means 14 mounted on the frame for supporting a component, such as an ECM pod (not shown) loaded thereon, a plurality of mobile carriages 16 disposed at the opposite ends of the frame 12, a plurality of linkage sets 18 articulately interconnecting the mobile carriages 16 with the frame, and a plurality of lift mechanisms 20 coupled between the linkage sets 18 and the frame and operable for raising and lowering the frame 12 relative to the mobile carriage 16.

The rectangular frame 12 includes a pair of elongated side members 22 and a pair of end members 24. The end members 24 are interconnected with the side members in any suitable way, such as by being welded together, to form a generally rectangular box-like structure. Means 14 take the form of a first pod support assembly, generally designated 26, and a second pod support assembly, generally designated 28.

The first support assembly 26 is composed of four individual supports 30 individually pivotally mounted at 31 to side members 22 of the frame 12 for movement between adjacent upright positions, as seen in FIGS. 2 and 3 and at the right half of the dolly 10 in FIG. 1, and remote lateral positions, as seen at the left half of the dolly in FIG. 1. In their upright positions, the supports 30 of the first support assembly 26 together can mount an ECM pod (not shown) having a configuration designation, AN/ALQ-131, on the dolly 10.

The supports 30 are identical in construction to one another, so the description of one will suffice for all of them. Each support 30 includes two spaced pairs of side support plates 32 interconnected by a stiffener plate 34 and a bearing plate 36 which horizontally extend at a generally right angle to one another. At the upper ends of the pairs of support plates 32 are rigidly attached pod mount blocks 38. The lower ends of the pairs of support plates are pivotally connected to the side frame members 22.

When the supports 30 of the first assembly 26 are pivoted to their upright positions, they rest on the top of the side members 22 on their bearing plates 36 and support the pod at mount blocks 38 so that it extends longitudinally between them.

The second support assembly 28 is composed of four U-shaped individual brackets 40 which attach to and form extensions of supports 30 of the first support assembly 26. In the upright positions of the supports 30, the brackets 40 together can mount an ECM pod (not shown) having a configuration designation, AN/ALQ-119, on the dolly 10.

The brackets 40 are identical in construction to one another, so the description of one will suffice for all of them. Each bracket 40 includes a pair of side plates 42 which are attached by bolts 44 to the side support plates 32 of the first assembly supports 30. By unfastening bolts 44 the brackets 40 may also be removed from the supports 30 when not in use. Interconnecting the side plates of the bracket 40 is a transverse pod mount plate 46. When the supports 30 of the first assembly 26 are pivoted to their upright positions, the brackets 40 support the pod at the plates 46 so that it extends longitudinally between them.

The supports 30 may be locked in their upright position by insertion of ball lock pins 48, as seen in FIG. 1. Once the dolly has moved the particular pod into position for mounting it on the aircraft, the pod is disconnected from the respective support or bracket, depending upon which configuration of pod is being installed. The supports are pivoted away from the released pod toward their lateral positions enough to clear the pod when the dolly is removed from the loading position.

The dolly 10 is made mobile by four carriages 16 which support the frame 12 at its four respective corners. The carriages 16 are identical to one another, so a description of one will suffice for all of them. Each carriage 16 includes a wheel 50, a support block 52, and a U-shaped bracket 54. The bracket 54 has an axle 56 which mounts the wheel 50 for rotation about a horizontal axis. The bracket 54, in turn, is mounted to the support block 52 for rotation about a generally vertical axis. Such mounting arrangement of the wheel to the bracket and the bracket to the support block renders the wheel 50 capable of a caster-like motion relative to the support block 52. A manually-actuated brake 57 is mounted on the axle 56 of each carriage wheel 50.

One linkage set 18 disposes one carriage 16 adjacent a respective corner of the frame 12 outwardly from one end member 24 thereof. The linkage sets 18 are identical to one another, so a description of one will suffice for all of them. As seen in greater detail in FIG. 4, each linkage set 18, which articulately interconnects the one mobile carriage 16 to one of the end members 24 and aligns the carriage 16 with the elongated extent of one of the side members 22, includes a pair of spaced mounting plates 58, an upper elongated drive arm 60, and a pair of lower guide links 62. The spaced mounting plates 58 are fixed to the one end member 24 of the frame 12 and extend therefrom in general alignment with the one of the side members 22 of the frame 12. The upper elongated drive arm 60 is pivotally journaled at one end at 64 between the mounting plates 58 and at the other end at 66 to the support block 52 of the one carriage 16. Each of the lower guide links 62 in the pair thereof is pivotally journaled at one end at 68 to one of the mounting plates 58 and at the other end at 70 to the support block 52 so as to extend parallel to the upper drive arm 60. In such arrangement, the pair of mounting plates 58, upper drive arm 60 and lower guide links 62 of the linkage set 18 together with the support block 52 of the carriage 16 form a parallelogram, four-bar linkage 72 which, upon movement between an extended position (FIG. 3) and a retracted position (FIG. 4), pivots in a generally vertical direction and allows generally rectilinear vertical movement of the frame 12 between a raised position (FIG. 3) and a lowered position (FIG. 4) relative to a carriage 16.

The four-bar linkages 72 (FIGS. 1, 2 and 3) are actuated between their extended and retracted positions by operation of four independent lift mechanisms 20. The lift mechanisms 20 are identical to one another, so a description of one will suffice for all of them. Each lift mechanism 20 is coupled between one end member 24 of the frame 12 and one of the linkage sets 18. More particularly, each lift mechanisms 20 includes a bell crank 74, a rod extension 76 and a screw jack 78.

The bell crank 74 has spaced opposite ends 80, 82 and is pivotally mounted at its enlarged mid section 84, which is located intermediate its ends, between the pair of mounting plates 58 of the one linkage set 18. Since the plates are fixed to the end member 24 of the frame 12, the crank 74 is, in effect, coupled to the frame 12. The rod extension 76 is pivotally connected at one end at 86 to the drive arm 60 of the one linkage set 18 and at an opposite end at 88 to the end 80 of the bell crank 74.

Figure 4:
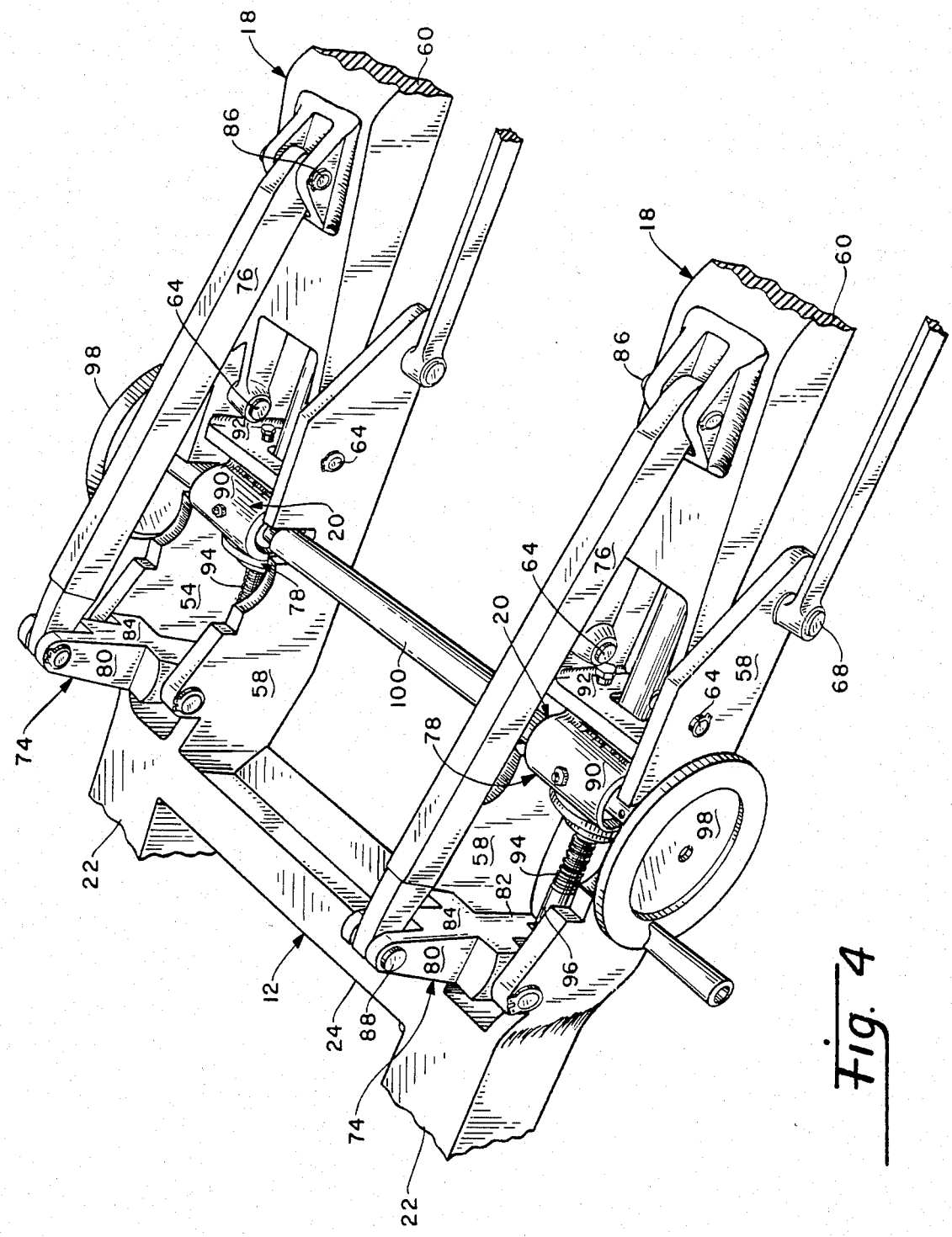
FIG. 4 is an enlarged fragmentary perspective view of the linkage sets and lift mechanisms at one end of the dolly of FIG. 1.

The screw jack 78 is horizontally disposed and stationarily mounted at its base 90 between the pair of mounting plates 58 of one linkage set 18. Specifically, the base 90 is attached to a support plate 92 which extends between and is fixed to the plates 58. The screw jack 78 also has an extensible and retractible screw shaft 94 which is pivotally connected at its end at 96 to the other end 82 of the bell crank 74, and a handcrank drive wheel 98 which is rotatable for causing extension and retraction of the screw shaft 94 in a generally horizontal direction. Such movement of the screw shaft 94 pivots the bell crank 74 and, in turn, articulates the end member 24 of the frame 12 relative to the one mobile carriage 16. Particularly, on the one hand, extension of the screw shaft 94 causes pivoting of the bell crank 74 in a first direction (clockwise in FIG. 4) and articulation of the one linkage set 18, via the connection of the rod extension 76 with the drive arm 60 of the linkage set 18, so as to cause raising of the frame 12 relative to the one carriage 16. On the other hand, retraction of the screw shaft 94 causes pivoting of the bell crank in a second opposite direction (counterclockwise in FIG. 4) and reverse articulation of the one linkage set 18 so as to cause lowering of the frame 12 relative to the one carriage 16. In other words, extension of the screw shaft 94 causes actuation of the four-bar linkage 72 to its extended position (FIG. 3), while retraction of the screw shaft 94 causes actuation of the four-bar linkage to its retracted position (FIG. 4).

The structural parts of the dolly 10 are fabricated from high strength aluminum alloy. Standard structural shapes are used where possible to gain a high strength to weight ratio thereby minimizing overall dolly weight. The light weight of the dolly enhances its ease of maneuverability and positioning under the aircraft and the use of the caster-type motion allows for infinite movement in all directions. The positive action of the screw jacks allow for infinite stop and hold positioning anywhere within the maximum lifting range, such being in the preferred embodiment about twelve inches. The pair of handcrank drive wheels 98 at each end of the dolly 10 are interconnected by a common shaft 100 such that rotation of either one wheel 98 at the particular dolly end actuates both screw jacks 78 at that end in identical fashion. The overall low height and optimized width of the dolly 10 allows for easy movement beneath the pod mounting pylon affixed to the aircraft. Furthermore, the compactness of the dolly 10 affords unimpeded negotiation in and around the landing gear, gear doors, aft fuselage ventrals and other stores, such as fuel tanks, already positioned on adjacent wing locations.

It is thought that the loading dolly of the present invention and many of its attendant advantages will be understood from the foregoing description and it will be apparent that various changes may be made in the form, construction and arrngement of the parts thereof without departing from the spirit and scope of the invention or sacrificing all of its material advantages, the form hereinbefore described being merely a preferred or exemplary embodiment thereof.

Having thus described the invention, what is claimed is:

1. A dolly for loading a component, such as an electronic countermeasure pod, on an aircraft, comprising:
    (a) a generally rectangular frame having a pair of elongated side members and a pair of end members interconnecting said side members
    (b) support assemblies mounted on said side members and being pivotable between adjacent upright positions for mounting said component on said frame and remote lateral positions for dismounting said component from said frame;
    (c) a pair of mobile carriages disposed adjacent each end member of said frame, each carriage including
        (i) a wheel,
        (ii) a support block, and
        (iii) a bracket rotatably mounting said wheel about a generally horizontal axis, said bracket, in turn, being rotatably mounted to said block about a generally vertical axis such that said wheel is capable of caster-like motion relative to said support block;
    (d) a pair of linkage sets disposed adjacent each end member of said frame, each linkage set articulately interconnecting one of said mobile carriages of said pair thereof with its respective end member, disposing said one carriage in spaced relationship from the other of said mobile carriage of said pair thereof and aligning said one carriage with the elongated extent of one of said side members of said frame, each linkage set including
        (i) a pair of spaced mounting plates fixed to and extending from said one end member in alignment with said one side member,
        (ii) an upper elongated drive arm journaled at one end between said mounting plates and at the other end to said support block of said one carriage, and
        (iii) a pair of lower guide links each journaled at one end to said mounting plates and at the other end to said support block so as to extend parallel to said upper drive arm,
        (iv) said pair of mounting plates, upper drive arm, lower guide links and said support block of said carriage forming a four-bar linkage which, upon movement between extended and retracted positions, causes generally rectilinear vertical movement of said frame between raised and lowered positions relative to said one carriage; and
    (e) a pair of lift mechanisms disposed adjacent each end member of said frame, each mechanism coupled between one of said linkage sets and its respective end member, said lift mechanism including
        (i) a bell crank having spaced apart opposite ends and being pivotally mounted at a location intermediate its ends between said pair of mounting plates of said one linkage set,
        (ii) a rod extension pivotally connected at one end to said drive arm of said one linkage set and at an opposite end to one end of said bell crank, and
        (iii) a screw jack horizontally disposed and stationarily mounted between said pair of mounting plates of said one linkage set and having an extensible and retractible screw shaft pivotally connected at its end to the other end of said bell crank and a drive wheel which is rotatable for causing extension and retraction of said screw shaft in a generally horizontal direction whereby extension of said screw shaft causes actuation of said four-bar linkage to its extended position, while retraction of said screw shaft causes actuation of said four-bar linkage to its retracted position.

2. A loading dolly, comprising:
    (a) an elongated frame having opposite ends;
    (b) means mounted on said frame for supporting a component loaded thereon;
    (c) a plurality of mobile carriages disposed and spaced apart from one another at each of said opposite ends of said frame, each said mobile carriage including a wheel, a support block, and a bracket rotatably mounting said wheel about a generally horizontal axis, said bracket, in turn, being rotatably mounted to said block about a generally vertical axis such that said wheel is capable of caster-like motion relative to said support block;
    (d) a plurality of linkage sets, each set articulately interconnecting one of said mobile carriages with its respective end of said frame for allowing generally rectilinear vertical movement of said frame relative to said carriage, each set including a pair of spaced mounting plates fixed to and extending from one of said ends of said frame, an upper elongated drive arm journaled at one end between said mounting plates and at the other end to said support block of one carriage, and a pair of lower guide links each journaled at one end to said mounting plates and at the other end to said support block of said carriage so as to extend parallel to said upper drive arm; and (e) a plurality of lift mechanisms, each mechanism coupled between one of said linkage sets and its corresponding end of said frame and being operable for raising and lowering said frame end relative to said one carriage which is connected to said one linkage set.

3. The loading dolly as recited in claim 2, wherein said pair of mounting plates, upper drive arm, lower guide link and said support block of said carriage forms a four-bar linkage which, upon movement between extended and retracted positions, causes generally rectilinear vertical movement of said frame between raised and lowered positions relative to said one carriage.

4. The loading dolly as recited in claim 2, wherein each said lift mechanism includes:

a bell crank having spaced apart opposite ends and being pivotally mounted at a location intermediate its ends between said pair of mounting plates of one linkage set;

a rod extension pivotally connected at one end to said drive arm of said one linkage set and at an opposite end to one end of said bell crank; and a screw jack horizontally disposed and stationarily mounted between said pair of mounting plates of said one linkage set and having an extensible and rectractible screw shaft pivotally connected at its end to the other end of said bell crank and a drive wheel rotatable for causing extension and retraction of said screw shaft in a generally horizontal direction whereby extension of said screw shaft causes pivoting of said bell crank in a first direction and articulation of said one linkage set, via said connection of said rod extension with said drive arm of said linkage set, so as to cause raising of said frame relative to said one carriage, while retraction of said screw shaft causes pivoting of said bell crank in a second opposite direction and reverse articulation of said one linkage set so as to cause lowering of said frame relative to said one carriage.

* * * * *